United States Patent
Zepke et al.

(10) Patent No.: US 7,479,861 B2
(45) Date of Patent: Jan. 20, 2009

(54) INDUCTIVELY COUPLED POWER, USEFUL FOR WIRELESS ELEVATOR HALL FIXTURES

(75) Inventors: Bruce E. Zepke, Glastonbury, CT (US); William A. Veronesi, Hartford, CT (US); Joseph Zacchio, Wethersfield, CT (US); Paul A. Stucky, Vernon, CT (US); Dennis W. Bellamy, Stafford Springs, CT (US); Christian M. Netter, Vernon, CT (US); Alberto Vecchiotti, Middletown, CT (US); Adriana H. Bacellar, Glastonbury, CT (US); Luiz F. Bacellar, Glastonbury, CT (US); Deborah C. Haas, Coventry, CT (US)

(73) Assignee: Otis Elevator Company, Farmington, CT (US)

( * ) Notice: Subject to any disclaimer, the term of this patent is extended or adjusted under 35 U.S.C. 154(b) by 397 days.

(21) Appl. No.: 10/552,383

(22) PCT Filed: Jun. 10, 2003

(86) PCT No.: PCT/US03/18597

§ 371 (c)(1),
(2), (4) Date: Oct. 7, 2005

(87) PCT Pub. No.: WO2005/005299

PCT Pub. Date: Jan. 20, 2005

(65) Prior Publication Data

US 2006/0207837 A1    Sep. 21, 2006

(51) Int. Cl.
    *H01F 17/06* (2006.01)
(52) U.S. Cl. .................................... 336/178; 187/290
(58) Field of Classification Search ......... 336/130–136, 336/178; 187/391, 290, 277, 289
    See application file for complete search history.

(56) References Cited

U.S. PATENT DOCUMENTS

| 5,572,178 | A  | * | 11/1996 | Becker et al. ............... 336/120 |
| 6,301,128 | B1 |   | 10/2001 | Jang et al. |
| 6,331,744 | B1 |   | 12/2001 | Chen et al. |
| 6,412,604 | B1 |   | 7/2002  | Schuster |
| 6,512,437 | B2 | * | 1/2003  | Jin et al. ..................... 336/178 |
| 7,106,163 | B2 | * | 9/2006  | Jin et al. ..................... 336/233 |
| 2001/0012208 | A1 |   | 8/2001 | Boys |
| 2002/0112924 | A1 |   | 8/2002 | Mori et al. |
| 2006/0022785 | A1 | * | 2/2006 | Dobbs ........................ 336/120 |

OTHER PUBLICATIONS

PCT International Search Report for PCT/US03/18597, dated Mar. 25, 2004.
International Preliminary Examination Report for PCT/US03/18597, dated Jul. 13, 2005.

* cited by examiner

*Primary Examiner*—Tuyen T. Nguyen
(74) *Attorney, Agent, or Firm*—Carlson, Gaskey & Olds

(57) ABSTRACT

Fixtures (27) at a doorway of a landing are formed integrally with a frame (17). Power is provided by an inductive coupler (32) having a core (70) and primary (75). The core is thin ferrite and extend significantly beyond the coils in the plane the coils are wound, to provide en extremely low resistance path for the efficient transfer of AC power.

8 Claims, 2 Drawing Sheets

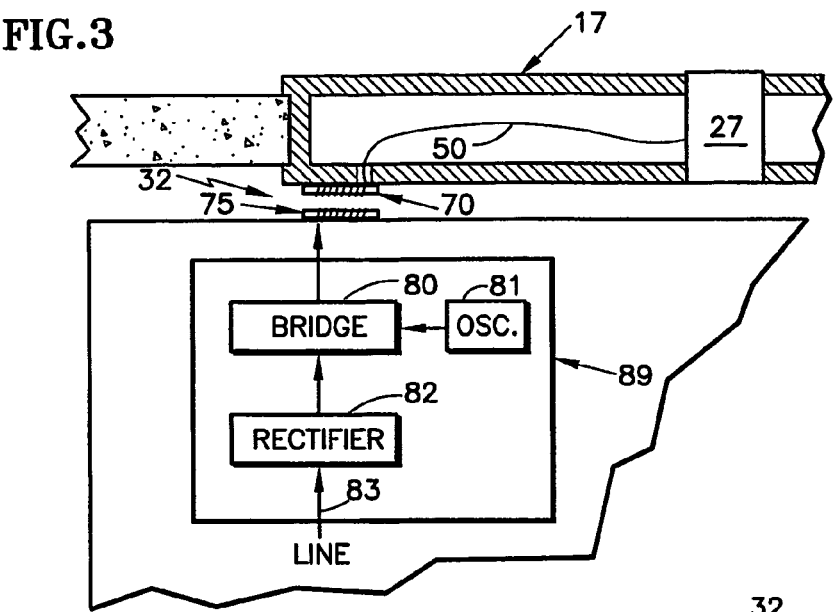
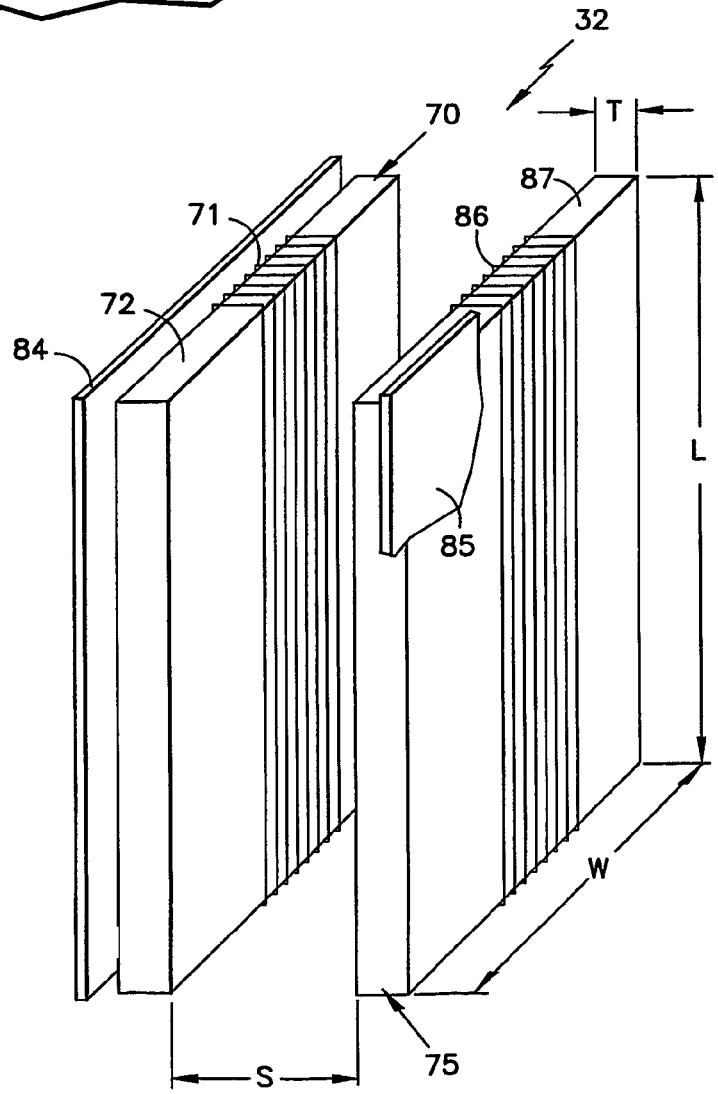

INDUCTIVELY COUPLED POWER, USEFUL FOR WIRELESS ELEVATOR HALL FIXTURES

This application is a 371 of PCT/US03/18597 filed Jun. 10, 2003.

TECHNICAL FIELD

This invention relates to inductive power coupling, useful, for instance, for powering elevator hall fixtures, including call button lights, directional lanterns, and floors indicators, for the purpose of elimination of building wiring. Wireless power is supplied to the hall fixtures by inductive coupling of power from the elevator while it is at the landing.

BACKGROUND ART

Elevator systems have hallway fixtures at each floor, including directional lanterns, hall call buttons, and in some cases, elevator position indicators. Traditionally, each hallway fixture on every floor was powered by means of wires run through the hoistway, with additional wires to provide signal communication between the floor and the controller, which has typically been located at the top of the hoistway in a machine room. To reduce the amount of wiring, modern systems use serial communication buses, which typically may require two wires for communication and two for power, one bus each for the lanterns and call buttons. The wiring requires significant installation time in new buildings, and makes modernization of existing elevators extremely difficult. Further, work in the hoistway is dangerous and should be avoided if possible.

The communication aspect of hall fixtures has been rendered wireless by means of radio frequency (or other) wireless communications. However, power is still required to be provided by wires, which must be specifically installed in the building during initial construction of an elevator system, or as a consequence of modernization.

Suggestions have been made to use very large coils disposed on the elevator car and the hoistway wall with large air gaps, such as the 30 mm (1.2 inch) running clearance between moving and stationary portions of an elevator system, which is required by typical regulatory codes, so that power can be inductively coupled from the car to the hoistway wall when the elevator car is at a landing, thereby to power the fixtures. It has also been suggested that magnetic coupling of power, such as between an elevator car and a hoistway wall, may be effectively achieved with coils having large C-shaped cores. However, it has been determined that large coils and C-shaped cores, with large air gaps, cannot effectively transfer the necessary power in a compact and efficient manner.

DISCLOSURE OF INVENTION

Objects of the invention include: an improved magnetic coupling for contactless power transfer; provision of improved contactless electric power transfer; provision of improved power transfer for wireless elevator hallway fixtures; and provision of improved power coupling for elevator hallway fixtures which receive power without building wiring.

This invention is predicated on our discovery that efficient, contactless inductive coupling for power transfer is effected by means of ferrite cores which are very much larger than the windings so as to provide a large area of magnetic coupling between a primary winding and a secondary winding.

According to the present invention, a magnetic power coupling comprises a large, low reluctance path through a required air-gap, such as, for instance, elevator/hoistway clearance, with a minimum of ferrite material, thereby saving costs and space and reducing the volt/amp requirements of driving electronics. A primary and a secondary both include a ferrite core with a winding wound onto the ferrite core, said ferrite cores being surrounded by said windings along the length of said windings and over a portion of the width of said windings, said ferrite cores having a length which is at least as great as the length of said winding, said ferrite cores having a length and width which is between two and ten times as great as the air-gap between the primary and secondary. According to the invention further, an inductive power coupling apparatus includes coupling high frequency electric power (e.g., tens of kilohertz), which may, for instance, be provided by an H-bridge in turn driven by DC power obtained by rectifying ordinary building line voltage, all of which form a high frequency AC source. On the secondary side, the received high frequency signal is simply rectified and used to charge a battery, which supplies the power to the fixtures as needed.

According further to the invention, power for elevator hall fixtures is provided by magnetic coupling with a source on an elevator car.

The invention provides a power coupling capability useful in a wide variety of applications; for instance, it obviates the need for any power wiring whatsoever at an installation of elevator hallway fixtures.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 3 is a partial, partially sectioned, top view of the door frame of FIG. 1 and an elevator car.

FIG. 4 is a perspective view of a magnetic coupling of the invention.

MODE(S) FOR CARRYING OUT THE INVENTION

Powering elevator hallway fixtures is one example of use of the invention.

Figure 1:
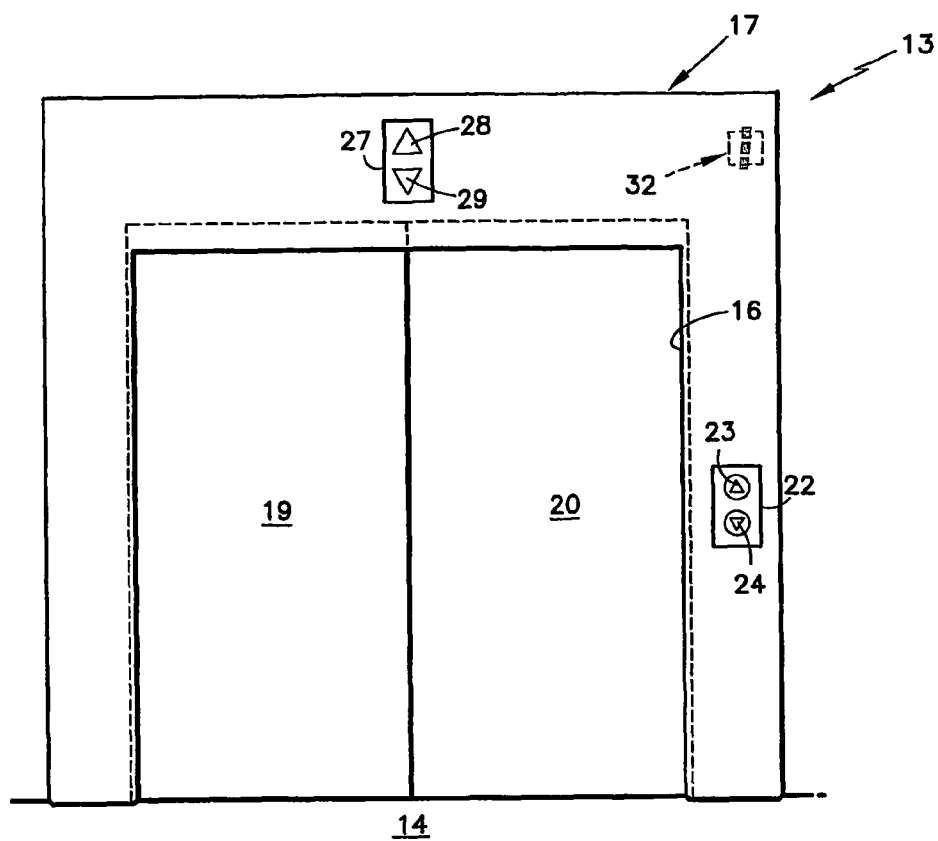
FIG. 1 is a front elevation view of an elevator hall door frame having fixtures and employing a magnetic coupling as a source of power, in accordance with the invention.

Referring to FIG. 1, a doorway 13 at a landing 14 of an elevator includes a hoistway door opening 16 defined by a door frame 17. The opening 16 is closed off by hoistway doors 19, 20 except when a car is servicing the landing 14 (which means stopped and opening the doors). The door frame includes a call module 22 which has one or two hall call buttons, in the conventional fashion such as an up call button 23 and a down call button 24. The call buttons may be illuminated by LEDs, or in some other suitable way, to indicate that a call has been registered. The door frame 17 also includes a lantern fixture 27 having one or two conventional directional arrows, such as an up directional arrow 28 and a down directional arrow 29 that are selectively illuminated to indicate the direction of elevator travel. The arrows may be illuminated by high-intensity LEDs, or in some other suitable way, to indicate car direction.

Figure 2:
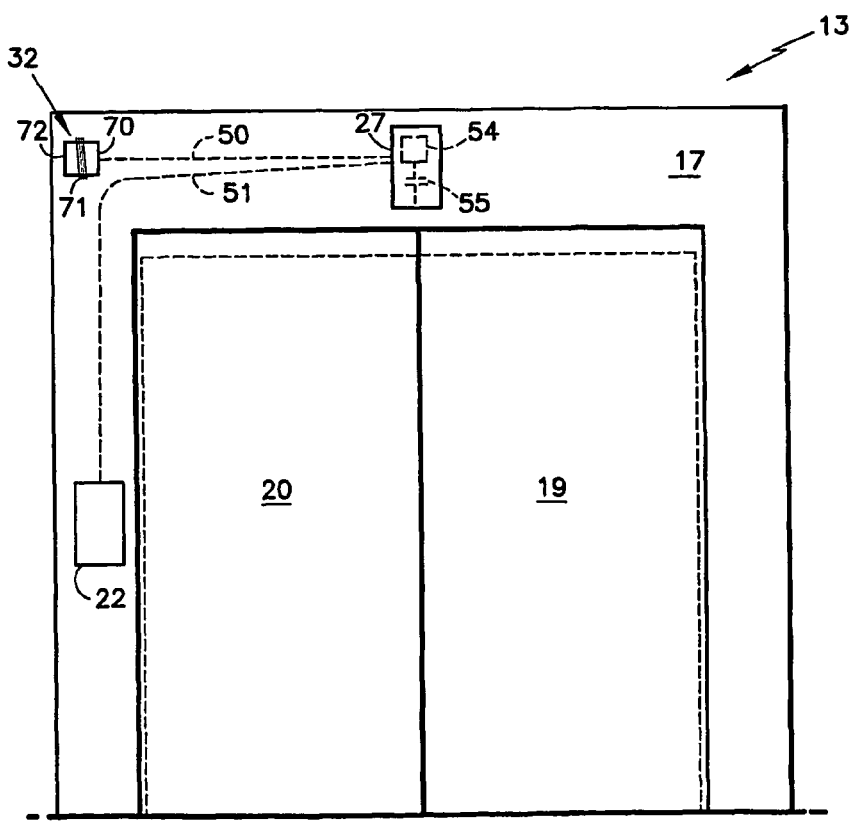
FIG. 2 is a rear elevation view of the hallway door frame of FIG. 1.

The fixtures 22, 27 are powered by the inductive coupler 32 of the invention, which is seen more clearly in FIG. 2.

In FIG. 2, the inductive coupler secondary 70 is shown connected by a cable 50 to the lantern fixture 27, which is connected to the call fixture 22 by a cable 51. The cables 50, 51 are within the frame 17. The lantern fixture 27 may have an electronic module 54 and an energy storage device, which may be a battery 55 or a super capacitor, all as is known in the art. The electronic modules will include circuits for receiving the high frequency current from the inductive coupler secondary 32, rectifying it, and using the power to charge the battery 55, all as is known and within the skill of the art. The electronic module 54 may also include communicating with the elevator controller, such as by radio frequency electromagnetic radiation, monitoring the remaining power of the battery 55, as well as controlling the application of power to the directional lights 28, 29 and to the up and down hall call buttons 23, 24. The module 54 may take the form of piconet modules, disclosed in commonly owned, copending patent application PCT/US02/32848, which may comprise modules conforming to BLUETOOTH specifications, utilized in the manner described in that application. Other electronic modules, which can operate with extreme low power consumption and provide adequate control and communication may be utilized, as desired.

The efficient inductive coupler secondary 70 has few turns of wire 71 but a very large ferrite core 72, as shown in FIGS. 3 and 4. On the elevator car, an inductive coupler primary 75, similar to the coupler secondary 70, receives high frequency power (e.g., about 20 kHz) from an H-bridge 80. The H-bridge 80 operates on DC power provided by a rectifier 82 in response to conventional AC line voltage 83, as is known in the art; H-Bridge 80 frequency is set by oscillator 81.

Referring to FIG. 4, the secondary 75 of the coupler 32 has a primary winding 86 wrapped around a core 87, both of which can be identical to the winding 71 and core 72 of the secondary 70. However, to decrease the AC and DC resistance in the primary winding 86, it may comprise twice as many wires or more of the same size as the secondary coil 71, driven in parallel.

To avoid losses to adjacent structures having magnetic reluctance, the primary and secondary have shields 84, 85, at least as large as the cores 72, 87, of aluminum or other non-magnetic material. There may be air-gaps between the shields and respective cores.

The cores 70, 75 are ferrite so as to provide minimum reluctance to the magnetic field, thereby increasing the efficiency with which power can be transferred from the primary to the secondary.

The width and length of the core, dimensions L and W, should be from 2 to 10 times the required air gap S.

The thickness, T, of the cores should be sufficiently large to keep the core from saturating or overheating. Increasing the cross-sectional area given by the core thickness, T, times the core length, L, reduces both saturation and overheating potential. However, L should be increased in preference to T so as to maximize the effective cross section of the magnetic circuit air gap. Thus, the thickness, T, of the cores is kept relatively small, less than 25% the width and more favorably nearer to 5%. Extremely thin cores, less 5% of the width, could be used but would likely present manufacturing difficulties. The exact thickness is driven by the material properties of the particular ferrite used. Examples are:

width (W) between 60 and 300 mm;
length (L) between 60 and 300 mm;
thickness (I) between 3 and 30 mm.

The length, L, of each core 70, 75 is selected to accommodate the length of the primary and secondary coils 71, 86; however, the cores could have extensions on either side of the coil, in some cases, in order to increase coupling, if desired.

The invention claimed is:

1. An inductive power coupler, comprising:
   a primary supported on an elevator car;
   a secondary supported on a stationary structure such that said secondary is separated from said primary by an air-gap;
   said primary and secondary each having a thin ferrite core with a coil wrapped around the core;
   each of said cores having a width extending outwardly from the corresponding coil, said width and a length of said cores being between two and ten times as large as said air-gap, and a thickness of 5%-25% of said width; and
   wherein said primary transfers power to said secondary.

2. An inductive power coupler according to claim 1, wherein said primary and secondary are separated by a gap of on the order of 25-35 millimeters (1-1.4 inch).

3. An inductive power coupler according to claim 1, wherein:
   said thickness is between 3 millimeters (0.12 inch) and 30 millimeters (1.2 inch);
   said length is no the order of 60 millimeters (2.4 inch) to 300 millimeters (12 inches); and
   said width is on the order of between 60 millimeters (2.4 inch) and 300 millimeters (12 inches).

4. An inductive power coupler according to claim 1, comprising
   an elevator hall fixture device coupled with the secondary for receiving power from the secondary.

5. An inductive power coupler according to claim 4, wherein the elevator hall fixture device comprises a lighted indicator.

6. An elevator hall fixture device, comprising:
   a primary;
   a secondary separated from said primary by an air-gap;
   said primary and secondary each having a thin ferrite core with a coil wrapped around the core;
   each of said cores having a width extending outwardly from the corresponding coil, said width and a length of said cores being between two and ten times as large as said air-gap, and a thickness of 5%-25% of said width; and
   an electrically powered elevator hall fixture that is coupled to the secondary to receive power from said secondary.

7. The elevator hall fixture device of claim 6, wherein the hall fixture comprises a lighted indicator.

8. The elevator hall fixture device of claim 6, wherein
   the primary is supported on an elevator car;
   the secondary is supported on a stationary structure; and
   said primary transfers power to said secondary.

* * * * *